United States Patent
Engström et al.

(10) Patent No.: US 12,170,169 B2
(45) Date of Patent: Dec. 17, 2024

(54) SUPER CAPACITOR MODULE FOR VEHICLE WITH HIGH VOLTAGE POWER SOURCE AND CONTROL METHOD THEREOF, COMPUTER PROGRAM, AND COMPUTER READABLE MEMORY

(71) Applicant: Ningbo Geely Automobile Research & Development Co., Ltd., Ningbo (CN)

(72) Inventors: Alexander Engström, Gothenburg (SE); Eric Rudervall, Mölndal (SE)

(73) Assignee: NINGBO GEELY AUTOMOBILE RESEARCH & DEVELOPMENT CO., LTD., Ningbo (CN)

( * ) Notice: Subject to any disclaimer, the term of this patent is extended or adjusted under 35 U.S.C. 154(b) by 372 days.

(21) Appl. No.: 17/506,626

(22) Filed: Oct. 20, 2021

(65) Prior Publication Data
US 2022/0044880 A1 Feb. 10, 2022

Related U.S. Application Data

(63) Continuation of application No. PCT/CN2020/085340, filed on Apr. 17, 2020.

(30) Foreign Application Priority Data

May 8, 2019 (EP) ...................................... 19173268

(51) Int. Cl.
*H01G 11/66* (2013.01)
*B60L 50/40* (2019.01)
(Continued)

(52) U.S. Cl.
CPC .............. *H01G 11/66* (2013.01); *B60L 50/40* (2019.02); *F02N 11/08* (2013.01); *H01G 11/08* (2013.01)

(58) Field of Classification Search
CPC .......... B60L 50/40; B60L 53/00; F02N 11/00; H01G 11/00
See application file for complete search history.

(56) References Cited

U.S. PATENT DOCUMENTS

| 2002/0158513 A1 | 10/2002 | Amano |
| 2003/0117019 A1* | 6/2003 | Furukawa ............... B60L 58/20 |
| | | 307/10.6 |

(Continued)

FOREIGN PATENT DOCUMENTS

| CN | 1647966 A | 8/2005 |
| CN | 101407180 A | 4/2009 |

(Continued)

OTHER PUBLICATIONS

International Search Report from corresponding International Application No. PCT/CN2020/085340, dated Jul. 15, 2020, 2 pages.

*Primary Examiner* — Rexford N Barnie
*Assistant Examiner* — Joseph N Inge
(74) *Attorney, Agent, or Firm* — Tucker Ellis LLP

(57) ABSTRACT

A super capacitor module for a vehicle with a high voltage power source includes a super capacitor, high power control electronics for controlling and actuating charging of the super capacitor, a high-powered DC-DC converter connected to super capacitor and adapted to be connected to a low voltage power supply system, a voltage comparison circuit connected to the super capacitor and adapted to be connected to a low voltage power source, the super capacitor module being adapted to be connected to at least one electric control units (ECC) for a vehicle and/or a starter motor for a vehicle.

9 Claims, 2 Drawing Sheets

(51) Int. Cl.
*F02N 11/08* (2006.01)
*H01G 11/08* (2013.01)

(56) References Cited

U.S. PATENT DOCUMENTS

| | | |
|---|---|---|
| 2008/0011528 A1 | 1/2008 | Verbrugge |
| 2009/0314561 A1 | 12/2009 | Handa |
| 2011/0100735 A1* | 5/2011 | Flett .................. B60L 50/13 |
| | | 180/65.285 |
| 2015/0001925 A1 | 1/2015 | Rebholz |
| 2015/0011358 A1 | 1/2015 | Proebstle |
| 2016/0105098 A1* | 4/2016 | Savulak .................. H02J 7/345 |
| | | 323/234 |
| 2018/0298862 A1 | 10/2018 | Choi |
| 2019/0036366 A1* | 1/2019 | Dohmeier .................. H02J 7/02 |
| 2020/0127487 A1* | 4/2020 | Franzén .............. F02N 11/0866 |

FOREIGN PATENT DOCUMENTS

| | | |
|---|---|---|
| CN | 101614177 A | 12/2009 |
| CN | 103187756 A | 7/2013 |
| CN | 104002656 A | 8/2014 |
| CN | 104309490 A | 1/2015 |
| CN | 106374604 A | 2/2017 |
| CN | 108270279 A | 7/2018 |
| CN | 108482130 A | 9/2018 |
| EP | 3425766 A1 | 1/2019 |
| IN | 109334430 A | 2/2019 |
| WO | 2017111500 A1 | 6/2017 |

\* cited by examiner

SUPER CAPACITOR MODULE FOR VEHICLE WITH HIGH VOLTAGE POWER SOURCE AND CONTROL METHOD THEREOF, COMPUTER PROGRAM, AND COMPUTER READABLE MEMORY

RELATED APPLICATION DATA

This application is a continuation of International Patent Application No. PCT/CN2020/085340, filed Apr. 17, 2020, which claims the benefit of European Patent Application No. 19173268.4, filed May 8, 2019, the disclosures of which are incorporated herein by reference in their entireties.

TECHNICAL FIELD

The present invention relates to a method for controlling a super capacitor module for a vehicle with a high voltage power source, a super capacitor module for a vehicle with a high voltage power source, a computer program, a computer readable memory and a super capacitor module. More specifically, the disclosure relates to a method for controlling a super capacitor module for a vehicle with a high voltage power source, a super capacitor module for a vehicle with a high voltage power source, a computer program, a computer readable memory and a super capacitor module.

BACKGROUND

Vehicles for transportation of persons and goods are rapidly changing how they function and how they are powered. The main power source being an internal combustion engine is no longer the natural solution. Previously a lead-acid battery was used primarily as an energy source to power the start engine of the vehicle and provide electricity to the car electrical equipment when the engine was not running. In modern vehicles conventional lead-acid batteries have a number of further functions. They provide energy for sleep functions as the alarm system, software download, parking heater, etc.; they provide energy for convenience functions as the radio, coupe fan, beams, etc.; they provide power to 12V the starter motor for vehicles with an internal combustion engine; they provide backup power and energy to the vehicle during DC-DC failure for a certain time; and they provide transient current support during high power demanding maneuvers.

Due to the transition to hybrid and electric vehicles there is in modern vehicles further also an additional energy source present. Moreover, the 12V alternator is often no longer used since power generation is desired on higher voltage, typically 48V, 400V, or 600V. In such an environment with a mix of traditional electronics running on 12V, while the main engine or auxiliary engine needs a high voltage power source there is a need for improvement in how these systems interact and cooperate for an optimal performance of the vehicles energy system. Vehicles need to be environmentally friendly, saving energy as much as possible, while still performing on a desired level.

SUMMARY

It is an object to mitigate, alleviate or eliminate one or more of the above-identified deficiencies in the art and disadvantages singly or in any combination and solve at least the above mentioned problem. According to a first aspect there is provided a method for controlling a super capacitor module for a vehicle with a high voltage power source, wherein the super capacitor module comprises: a super capacitor, high power control electronics for controlling and actuating charging of the super capacitor, a high-powered DC-DC converter connected to super capacitor and adapted to be connected to a low voltage power supply system, a voltage comparison circuit connected to the super capacitor and adapted to be connected to a low voltage power source, the super capacitor module being adapted to be connected to at least one electric control unit (ECU) for a vehicle and/or a starter motor for a vehicle. The method comprises the steps of: detecting that a low voltage power source is attached to the super capacitor module, in response to detecting that a low voltage power source is attached to the super capacitor module, operating the high-power control electronics so as to choose charging intervals of the super capacitor so that the voltage of the super capacitor is above the nominal voltage of the low power source, detecting that a low voltage power source is not attached to the super capacitor module, detecting that at least one ECU is connected to the super capacitor module, in response to not detecting that a low voltage power source is attached to the super capacitor module and detecting that an ECU is connected to the super capacitor module, operating the high-power control electronics so as to choose charging intervals of the super capacitor within allowable intervals for the at least one ECU, detecting that a starter motor is not attached to the super capacitor module, in response to not detecting that a starter motor is attached to the super capacitor module, utilizing the high-powered DC-DC circuit to convert high voltage power from the high voltage power source to low voltage and supplying the low voltage to the low voltage supply system.

In this way the problems of the prior art are solved by using a super capacitor. Energy problems related to super capacitors can be eliminated and high and low voltage systems are integrated and optimized. As super capacitors are superior to lead-acid batteries for power usage, cycling and reliability applications performance in terms of energy will increase using the embodiment according to the disclosed first aspect.

According to some embodiments, the method comprises the step of detecting that the vehicle is in parking mode, and in response to detecting that a low voltage power source is attached to the super capacitor module and that the vehicle is in parking mode, operating the high-power control electronics so as to choose charging intervals of the super capacitor so that the voltage of the super capacitor is higher than the nominal voltage of the low power source. In that way the super capacitor is always charged enough to be able provide energy to a low voltage power supply system for equipment in the vehicle.

According to some embodiments, the step of operating the high-power control electronics so as to choose charging intervals of the super capacitor within allowable intervals for the at least one ECU, includes choosing charging intervals of the super capacitor within allowable intervals for all connected ECUs to optimize the vehicle system of different energy sources and energy needs. As the charging of a super capacitor is fast and thereby demanding, this is an important feature for a well-functioning system in a vehicle having a super capacitor.

According to a second aspect there is provided a super capacitor module for a vehicle with a high voltage power source, wherein the super capacitor module comprises: a super capacitor, high power control electronics for controlling and actuating charging of the super capacitor, a high-powered DC-DC converter connected to the super capacitor and adapted to be connected to a low voltage power supply system, a voltage comparison circuit connected to the super capacitor and adapted to be connected to a low voltage power source, the super capacitor module being adapted to be connected to at least one electronic control units for a vehicle and/or a starter motor for a vehicle, wherein the super capacitor module is adapted to perform the method steps of the first aspect.

According to some embodiments, the low voltage power source is a 12v battery supplying voltage in the range of 5-18v, preferably 12-15 v.

According to some embodiments, the high voltage power source has a voltage in the range of 48-600v. The voltage chosen is dependent on the vehicle requirements and the type of engine and/or other equipment and power sources.

According to some embodiments, the super capacitor module for a vehicle with a high voltage power source comprises high power MOSFET or IGBT switches for connecting the super capacitor to the low voltage power supply system of the vehicle.

According to some embodiments, the super capacitor module for a vehicle with a high voltage power source comprises an auxiliary battery to supply energy during periods where the super capacitor is unable to provide power to the high-powered DC-DC converter. The auxiliary battery can be a medium to high voltage battery.

According to a third aspect there is provided a computer program comprising the method steps according to the first aspect.

According to a fourth aspect there is provided a computer readable memory comprising the computer program of the third aspect.

According to a fifth aspect there is provided a super capacitor module according to the second aspect, further comprising a control unit comprising the memory of the fourth aspect, wherein the control unit is adapted to execute the computer program of the third aspect.

Effects and features of the second through fifth aspects are to a large extent analogous to those described above in connection with the first aspect. Embodiments mentioned in relation to the first aspect are largely compatible with the second through fifth aspects.

A further scope of applicability of the present invention will become apparent from the detailed description given below. However, it should be understood that the detailed description and specific examples, while indicating preferred embodiments of the invention, are given by way of illustration only. Various changes and modifications within the scope of the invention will become apparent to those skilled in the art from the detailed description.

Hence, it is to be understood that the herein disclosed invention is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

The term "connection" is used for electrical connection between components throughout the description. It is understood that the connection for some components is for power supply/power transfer only and for some components is a signal or data connection.

BRIEF DESCRIPTION OF THE DRAWINGS

The above objects, as well as additional objects, features and advantages of the present invention, will be more fully appreciated by reference to the following illustrative and non-limiting detailed description of example embodiments of the present invention, when taken in conjunction with the accompanying drawings.

DETAILED DESCRIPTION

The present invention will now be described with reference to the accompanying drawings, in which currently preferred example embodiments of the invention are shown. This invention may, however, be embodied in many different forms and should not be construed as limited to the herein disclosed embodiments. The disclosed embodiments are provided to fully convey the scope of the invention to the skilled person.

Figure 1:
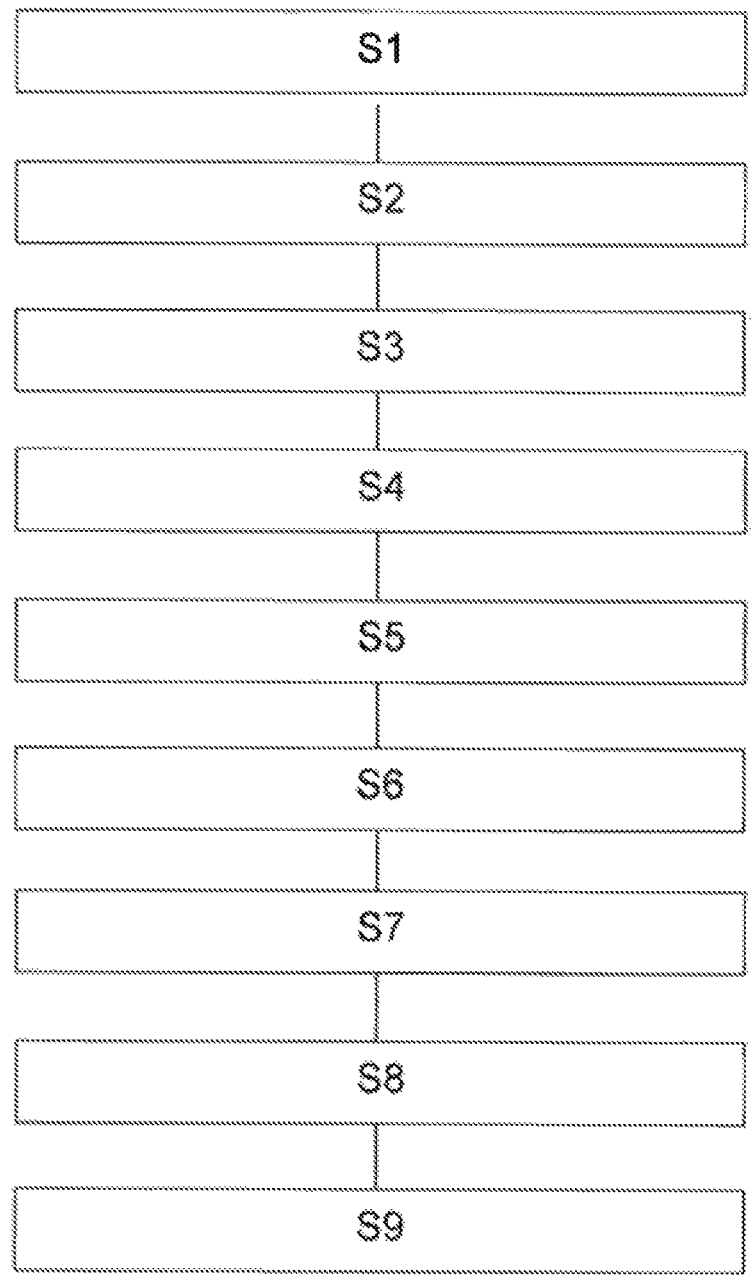
FIG. 1 shows a block diagram over the method according to the invention.

FIG. 1 shows a block diagram over the method according to the invention in line with the first aspect of this disclosure. A method is disclosed for controlling a super capacitor module 1 for a vehicle with a high voltage power source 2. The super capacitor module 1 shown in FIG. 2 comprises: a super capacitor 3, high power control electronics 4 for controlling and actuating charging of the super capacitor 3, a high-powered DC-DC converter 5 connected to super capacitor 3 and adapted to be connected to a low voltage power supply system 6, a voltage comparison circuit 7 connected to the super capacitor 3 and adapted to be connected to a low voltage power source 8, the super capacitor module 1 being adapted to be connected to at least one Electric Control Units ECU 9 for a vehicle and/or a starter motor 10 for a vehicle. The first step of the method comprises detecting S1 that a low voltage power source 8 is attached to the super capacitor module 1, in response to detecting that a low voltage power source 8 is attached to the super capacitor module 1. The second step of the method comprises operating S2 the high-power control electronics so as to choose charging intervals of the super capacitor 3 so that the voltage of the super capacitor is above the nominal voltage of the low voltage power source 8. The third step of the method comprises detecting S3 that a low voltage power source is not attached to the super capacitor module 1. The fourth step of the method comprises detecting S4 that at least one ECU 9 is connected to the super capacitor module 1, in response to not detecting that a low voltage power source 8 is attached to the super capacitor module 1 and detecting that an ECU 9 is connected to the super capacitor module 1. The fifth step of the method comprises operating S5 the high-power control electronics so as to choose charging intervals of the super capacitor 3 within allowable intervals for the at least one ECU 9. The sixth step of the method comprises detecting S6 that a starter motor 10 is not attached to the super capacitor module 1, in response to not detecting that a starter motor 10 is attached to the super capacitor module 1. The seventh step of the method comprises utilizing S7 the high-powered DC-DC circuit 5 to convert high voltage power from the high voltage power source 1 to low voltage and supplying the low voltage to the low voltage supply system.

By the inventive method, energy problems related to super capacitors can be eliminated and high and low voltage systems can be integrated and optimized in one system for a vehicle. As super capacitors are superior to lead-acid batteries for power usage, cycling and reliability applications performance in terms of energy will increase by using the inventive method.

The method further comprises the step of detecting S8 that the vehicle is in parking mode, and in response to detecting that a low voltage power source 8 is attached to the super capacitor module 3 and that the vehicle is in parking mode, operating S2 the high-power control electronics 4 so as to choose charging intervals of the super capacitor 3 so that the voltage of the super capacitor 3 is higher than the nominal voltage of the low power source 8.

The method further comprises the step of operating S5 the high-power control electronics so as to choose charging intervals of the super capacitor 3 within allowable intervals for the at least one ECU 9, includes choosing S9 charging intervals of the super capacitor 3 within allowable intervals for all connected ECUs.

Figure 2:
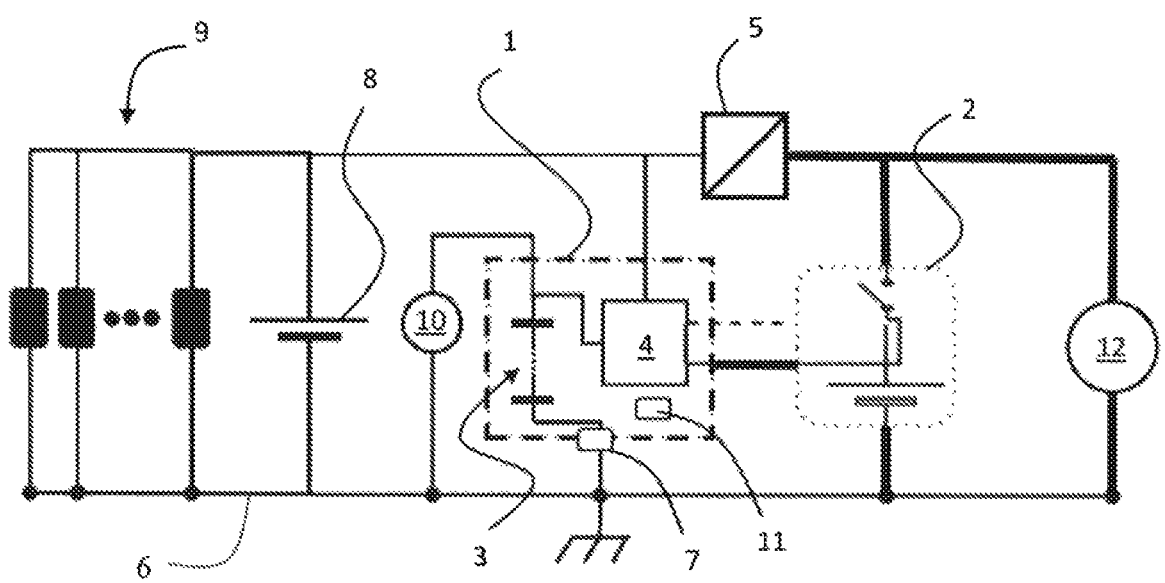
FIG. 2 shows a layout of an electrical system of a vehicle having a super capacitor module according to the invention.

FIG. 2 shows a layout of an electrical system of a vehicle having a super capacitor module 1 according to the invention. A super capacitor module 1 for a vehicle with a high voltage power source 2 is shown, wherein the super capacitor module 1 comprises a super capacitor 3, high power control electronics 4 for controlling and actuating charging of the super capacitor 3. A high-powered DC-DC converter 5 is connected to the super capacitor 3 and is adapted to be connected to a low voltage power supply system 6. A voltage comparison circuit is connected to the super capacitor 3 and adapted to be connected to a low voltage power source 8. The super capacitor module 1 is further adapted to be connected to at least one Electronic Control Units (ECU) 9 for a vehicle and/or a starter motor 10 for a vehicle, wherein the super capacitor 3 module is adapted to perform the method steps of the first aspect.

The low voltage power source 8 in FIG. 2 is a 12V battery supplying voltage in the range of 5-18V, preferably 12-15 V. The high voltage power source has a voltage in the range of 48-600V. The super capacitor further has high power MOSFET or IGBT switches for connecting the super capacitor 3 to the low voltage power supply system 6 of the vehicle. The super capacitor module is further optionally connected to an auxiliary battery to supply energy during periods where the super capacitor 3 is unable to provide power to the high-powered DC-DC converter.

The super capacitor module 1 of FIG. 2 further comprises a control unit 11 comprising the memory, wherein the control unit is adapted to execute the computer program of the third aspect disclosed herein.

The super capacitor module described enables super capacitors to be connected to the high voltage power source of a vehicle and adapted to be charged by it. The system utilizes a high-powered DC-DC circuit together with a voltage comparison circuit for vehicles without starter motor. The voltage comparison circuit activates the power transfer when the super capacitor voltage is e.g. between 9-11 V. The voltage comparison circuit turns off the power transfer when the voltage exceeds the maximum allowed voltage in the vehicle. The system further enables the super capacitor to connect to the vehicle board net via high power MOSFET or IGBT switches for vehicles with starter motor. The system utilizes an auxiliary battery to supply energy during a DC-DC malfunction and utilizes software to enable/disable charging and choosing charging intervals so that the voltage super capacitor cycling is always above the nominal voltage of the lead-acid battery for vehicles where lead-acid batteries are present. The system enables choosing the charging intervals within the allowable interval for the ECUs for vehicles without a lead-acid.

The person skilled in the art realizes that the present invention is not limited to the preferred embodiments described above. The person skilled in the art further realizes that modifications and variations are possible within the scope of the appended claims. E.g. it is understood that what is described as a super capacitor can be a number of super capacitors to expand the capacity of energy storage. Additionally, variations to the disclosed embodiments can be understood and effected by the skilled person in practicing the claimed invention, from a study of the drawings, the disclosure, and the appended claims.

What is claimed is:

1. A method for controlling a super capacitor module for a vehicle with a high voltage battery, wherein the super capacitor module is connected to the high voltage battery and_comprises:
   a low voltage super capacitor, a high power control electronics for controlling and actuating charging of the low voltage super capacitor, a high-powered DC-DC converter connected to the low voltage super capacitor and connected to a low voltage power supply system, a voltage comparison circuit connected to the low voltage super capacitor and connected to a low voltage lead-acid battery, the super capacitor module being connected to at least one Electric Control Units (ECU) for a vehicle or a starter motor for a vehicle, wherein the method comprises the steps of:
   detecting whether a low voltage lead-acid battery is attached to the super capacitor module, in response to detecting that a low voltage lead-acid battery is attached to the super capacitor module, operating the high-power control electronics for charging the low voltage super capacitor so that the voltage of the low voltage super capacitor is above a nominal voltage of the low voltage lead-acid battery,
   detecting whether_a low voltage lead-acid battery is not attached to the super capacitor module, and checking whether at least one ECU is connected to the super capacitor module, in response to not detecting that a low voltage lead-acid battery is attached to the super capacitor module and detecting that an ECU is connected to the super capacitor module, operating the high-power control electronics for charging the low voltage super capacitor within allowable intervals for the at least one ECU,
   detecting whether the starter motor is not attached to the super capacitor module, in response to not detecting that the starter motor is attached to the super capacitor module, utilizing the high-powered DC-DC circuit to convert high voltage power from the high voltage battery to low voltage and supplying the low voltage to the low voltage power supply system.

2. The method for controlling a super capacitor module according to claim 1, further comprising the step of detecting whether the vehicle is in parking mode, and in response to detecting that a low voltage lead-acid battery is attached to the super capacitor module and that the vehicle is in parking mode, operating the high-power control electronics for charging the low voltage super capacitor so that the voltage of the low voltage super capacitor is higher than the nominal voltage of the low voltage lead-acid battery.

3. The method for controlling a super capacitor module according to claim 1, wherein the step of operating the high-power control electronics for charging the low voltage super capacitor within allowable intervals for the at least one ECU, includes charging the low voltage super capacitor within allowable intervals for all connected ECUs.

4. A super capacitor module for a vehicle with a high voltage battery, wherein the super capacitor module comprises: a low voltage super capacitor, high power control electronics for controlling and actuating charging of the low voltage super capacitor, a high-powered DC-DC converter connected to the low voltage super capacitor and connected to a low voltage power supply system, a voltage comparison circuit connected to the low voltage super capacitor and connected to a low voltage lead-acid battery, the super capacitor module being-connected to at least one Electronic Control Units (ECU) for a vehicle or the starter motor for a vehicle, wherein the super capacitor module is adapted to:
   detect whether a low voltage lead-acid battery is attached to the super capacitor module, in response to detecting that a low voltage lead-acid battery is attached to the super capacitor module, operate the high-power control electronics for charging the low voltage super capacitor so that the voltage of the low voltage super capacitor is above a nominal voltage of the low voltage lead-acid battery,
   detect whether a low voltage lead-acid battery is not attached to the super capacitor module, and check whether at least one ECU is connected to the super capacitor module, in response to not detecting that a low voltage lead-acid battery is attached to the super capacitor module and detecting that an ECU is connected to the super capacitor module, operate the high-power control electronics for charging the low voltage super capacitor within allowable intervals for the at least one ECU,
   detect whether the starter motor is not attached to the super capacitor module, in response to not detecting that the starter motor is attached to the super capacitor module, utilize the high-powered DC-DC circuit to convert high voltage power from the high voltage battery to low voltage and supplying the low voltage to the low voltage power supply system.

5. The super capacitor module according to claim 4, wherein the low voltage lead-acid battery is a 12V battery supplying voltage in the range of 5-18V, preferably 12-15 V.

6. The super capacitor module according to claim 4, wherein the high voltage battery has a voltage in the range of 48-600V.

7. The super capacitor module according to claim 4, further comprising high power MOSFET or IGBT switches connecting the low voltage super capacitor to the low voltage power supply system of the vehicle.

8. The super capacitor module according to claim 4, further comprising auxiliary battery to supply energy during periods where the low voltage super capacitor is unable to provide power to the high-powered DC-DC converter.

9. A non-transitory computer readable medium storing a computer program comprising instructions that, when executed by a processor, cause a super capacitor module to:
   detect whether a low voltage lead-acid battery is attached to the super capacitor module, in response to detecting that a low voltage lead-acid battery is attached to the super capacitor module, operate the high-power control electronics for charging the low voltage super capacitor so that the voltage of the low voltage super capacitor is above a nominal voltage of the low voltage lead-acid battery,
   detect whether a low voltage lead-acid battery is not attached to the super capacitor module, and check whether at least one ECU is connected to the super capacitor module, in response to not detecting that a low voltage lead-acid battery is attached to the super capacitor module and detecting that an ECU is connected to the super capacitor module, operate the high-power control electronics for charging the low voltage super capacitor within allowable intervals for the at least one ECU,
   detect whether the starter motor is not attached to the super capacitor module, in response to not detecting that the starter motor is attached to the super capacitor module, utilize the high-powered DC-DC circuit to convert high voltage power from the high voltage battery to low voltage and supplying the low voltage to the low voltage power supply system.

* * * * *